United States Patent [19]
Lalouette et al.

[11] Patent Number: 5,793,572
[45] Date of Patent: Aug. 11, 1998

[54] SHOCK RESISTANT ACTUATOR LATCH FOR A DISK DRIVE

[75] Inventors: Marc J. Lalouette, Fremont; Jeremy M. Cowperthwaite, Morgan Hill, both of Calif.

[73] Assignee: Quantum Corporation, Milpitas, Calif.

[21] Appl. No.: 803,732

[22] Filed: Feb. 21, 1997

[51] Int. Cl.$^6$ ................................................ G11B 5/54
[52] U.S. Cl. ............................................................ 360/105
[58] Field of Search .......................................... 360/105

[56] References Cited

U.S. PATENT DOCUMENTS

| | | | |
|---|---|---|---|
| 5,319,511 | 6/1994 | Lin | 360/105 |
| 5,341,259 | 8/1994 | Amirkiai | 360/105 |
| 5,483,399 | 1/1996 | Jeong | 360/105 |
| 5,715,118 | 2/1998 | Tacklind | 360/105 |

*Primary Examiner*—A. J. Heinz
*Attorney, Agent, or Firm*—Nydegger & Associates; Debra A. Chun

[57] ABSTRACT

A latch for retaining a transducer substantially in a landing zone of a storage disk of a disk drive is provided herein. The disk drive includes an actuator assembly having an actuator contact area which moves on an actuator path. The latch includes a latch arm, a latch contact area, a return device, an air vane, and a secondary stop. The latch arm rotates between an engaged position in which the latch contact area is positioned in the actuator path and a disengaged position in which the latch contact area is positioned outside the actuator path. The return member includes a ferromagnetic body which moves along a body path which is closest to a magnet of the actuator assembly when the latch arm is in the engaged position. The attraction between the ferromagnetic body and the magnet retains the latch arm in the engaged position during non-rotation of the disk. The secondary stop is spaced apart from a latch crash stop of the disk drive when the latch arm is in the engaged position. The secondary stop contacts the latch crash stop of the disk drive upon sufficient movement of the latch arm. This dampens movement of the latch arm. Further, the latch contact area is also designed to dampen movement of the latch arm.

31 Claims, 4 Drawing Sheets

SHOCK RESISTANT ACTUATOR LATCH FOR A DISK DRIVE

FIELD OF THE INVENTION

The present invention relates generally to disk drives for storing data. More specifically, the present invention relates to a latch and method for selectively inhibiting the movement of an actuator assembly when the disk drive is subjected to a shock force. The latch provided herein is particularly resilient to rotary shock forces.

BACKGROUND

Disk drives are widely used in computers and data processing systems for storing information in digital form. In conventional Winchester disk drives, a transducer assembly "flies" upon an air bearing or cushion in very close proximity to a storage surface of a rotating data storage disk. The storage surface carries a thin film of magnetic material having a multiplicity of magnetic storage domains that may be recorded and read back by the transducer assembly.

The transducer assembly is supported proximate the storage surface using an actuator arm which is accurately positioned with a voice coil motor. Typically, the voice coil motor is either a linear or rotary actuator motor which moves the actuator arm along a predetermined path to position the transducer assembly relative to the surface of the storage disk. The combination of the transducer assembly, actuator arm, and the voice coil motor are commonly referred to as the actuator assembly.

The air bearing or cushion, which enables the transducer assembly to fly in close proximity to the surface of the disk, is created by air flow caused by rotation of the disk. When the disk rotation ceases, the air cushion dissipates and the transducer assembly is no longer supported above the surface of the disk.

Thus, when power is removed from the spindle motor that rotates the disk, the transducer assembly comes to "rest" or "land" on the surface of the disk. Likewise, when the spindle motor is powered up, the transducer assembly "takes off" from the surface of the disk. The landing and/or taking off can lead to loss of data at best and failure of the disk drive at worst, due to erosion or scarring of the magnetic film on the surface of the disk.

To ensure that the transducer assembly does not come to rest upon an area of useful data storage, the actuator assembly positions the transducer assembly over a landing zone or parking zone on the surface of the disk as power is removed from the disk drive.

While the disk drive is not in operation, friction between the transducer assembly and the surface of the disk maintains the transducer actuator assembly in the landing zone. However, linear and rotary shocks to the disk drive can cause the transducer assembly to move or slide radially across the surface of the disk. Such movements can cause damage to the surface of the disk, as well as damage to the transducer assembly. This can result in loss of data and/or transducer malfunction which can render the disk drive inoperable.

Consequently, a variety of latching devices are currently used to retain the actuator assembly while the disk is not rotating. When the disk has attained a sufficient rotational velocity to produce an air bearing for the transducer assembly, the latching device releases the actuator assembly. This enables the actuator assembly to operate through its predetermined path of travel relative to the surface of the disk.

One such latching device includes an air vane positioned proximate the disk of the disk drive and a latch arm for engaging the actuator assembly. The air vane uses kinetic energy generated by airflow from the rotating disk to move the latch arm to a disengaged position in which the actuator assembly is free to move.

These latches also include a return device for moving the latch arm to an engaged position, which inhibits movement of the actuator assembly, during non-rotation of the disk. Typically, the return device includes a stopping pin which contacts a fixed stop of the disk drive whenever the latch arm is in the engaged position. Therefore, travel of the latching device is limited by the contact of the stopping pin against the fixed stop of the disk drive.

Although conventional air vane latches are resilient to linear shock, these latches are somewhat susceptible to excessive rotary shock. For example, it has been discovered that when the disk drive is subjected to an excessive rotary shock, the actuator assembly contacts the latch arm and causes the latch arm to deflect. As a result of the deflection, a gap temporarily exists between the stopping pin and the fixed stop. Subsequently, as the shock subsides, the latch arm springs back, past its original shape, and the stopping pin hits the fixed stop with a relatively large impact force. Depending upon the timing and the amount of impact force, this can cause rebounding and/or movement of the latch arm away from the engaged position and the subsequent release of the actuator assembly.

In light of the above, it is an object of the present invention to provide a reliable, simple, and efficient latch which effectively protects against relatively large rotary and linear shock forces. Yet another object of the present invention is to provide a latch for a disk drive which is relatively easy to manufacture and assemble.

SUMMARY

The present invention is directed to a latch for a disk drive which satisfies these objectives. The latch provided herein is useful for selectively restraining an actuator assembly with a transducer substantially in a landing zone of a storage disk. The latch includes a latch arm, a latch contact area, a return device, and a secondary stop. As described in detail below, the unique design of the latch contact area and the secondary stop inhibits the latch from releasing the actuator assembly when the disk drive is subjected to excessive rotary shock.

The latch arm is movable between an engaged position and a disengaged position relative to a drive housing of the disk drive. Typically, the latch arm is attached to a latch hub which rotates around a latch axis relative to the drive housing. Preferably, the latch arm includes a triangular shaped support section which inhibits bending, since excessive bending or flexing of the latch arm can cause the secondary stop to slam against a latch crash stop of the disk drive. Accordingly, the support section inhibits the latch arm from moving from the engaged position towards the disengaged position.

The latch contact area engages or contacts the actuator assembly when the latch arm is in the engaged position and inhibits rotation of the actuator assembly. As provided herein, the latch contact area moves on a latch path relative to the drive housing when the latch arm is moved between the engaged position and the disengaged position. The latch path intersects an actuator path of an actuator contact area when the latch arm is in the engaged position. This inhibits rotation of the actuator assembly.

Preferably, the latch contact area extends laterally and cantilevers from the latch arm. This configuration allows the latch contact area to deflect towards the latch hub, thereby absorbing some of the shock force and reducing the shock force directed towards the latch arm. Further, since the latch contact area deflects towards the latch hub, the latch contact area will not tend to induce a moment to the latch arm as the latch contact area returns to its pre-shock configuration. Thus, the latch arm is less likely to rotate from the engaged position towards the disengaged position.

The return device retains the latch arm in the engaged position. For ease of assembly, the return device can be a ferromagnetic body that is attracted to a magnet of the actuator assembly. In this embodiment, the ferromagnetic body moves on a body path which is closest to the magnet when the latch arm is in the engaged position. Thus, with this unique design, the ferromagnetic body retains the latch arm in the engaged position without a stopping pin contacting a fixed stop, since the ferromagnetic body is closest to the magnet at the engaged position.

The secondary stop engages a latch crash stop of the disk drive upon sufficient movement of the latch arm, caused by a shock to the disk drive. As provided herein, the secondary stop is positioned proximate the latch crash stop, i.e., a flux return plate of the disk drive, when the latch arm is in the engaged position. Preferably, the secondary stop is positioned a travel distance away from the latch crash stop when the latch arm is in the engaged position. This is preferred since movement of the latch arm through the travel distance allows the latch arm to dissipate a significant amount of energy. Thus, the secondary stop impacts the latch crash stop with less force. Accordingly, this design improves the resistance of the latch to rotary shock and allows the latch to reliably stay in the engaged position at shock levels which exceed 40,000 rad/s**2.

Additionally, the latch can include an air vane for moving the latch arm from the engaged position to the disengaged position upon rotation of the storage disk. The air vane is positioned proximate the disk and uses airflow generated from the rotating disk to move the latch arm to the disengaged position, where the actuator assembly is free to move.

The present invention also includes a method for selectively restraining the transducer in the landing zone. The method includes the steps of retaining the latch arm in an engaged position during non-rotation of the storage disk with a return device, engaging the actuator assembly with a latch contact area, and inhibiting movement of the latch arm from the latched position, during shock to the disk drive, with a secondary stop. As described above, the secondary stop is positioned a travel distance away from the latch crash stop of the disk drive when the latch arm is in the engaged position.

Importantly, the unique design of the latch provided herein improves the resistance of the disk drive to rotary shock. The secondary stop, spaced apart from the latch crash stop and the latch contact area which deflects towards the latch hub, results in a latch which remains substantially in the engaged position, even when the disk drive is subjected to excessive rotary shock.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
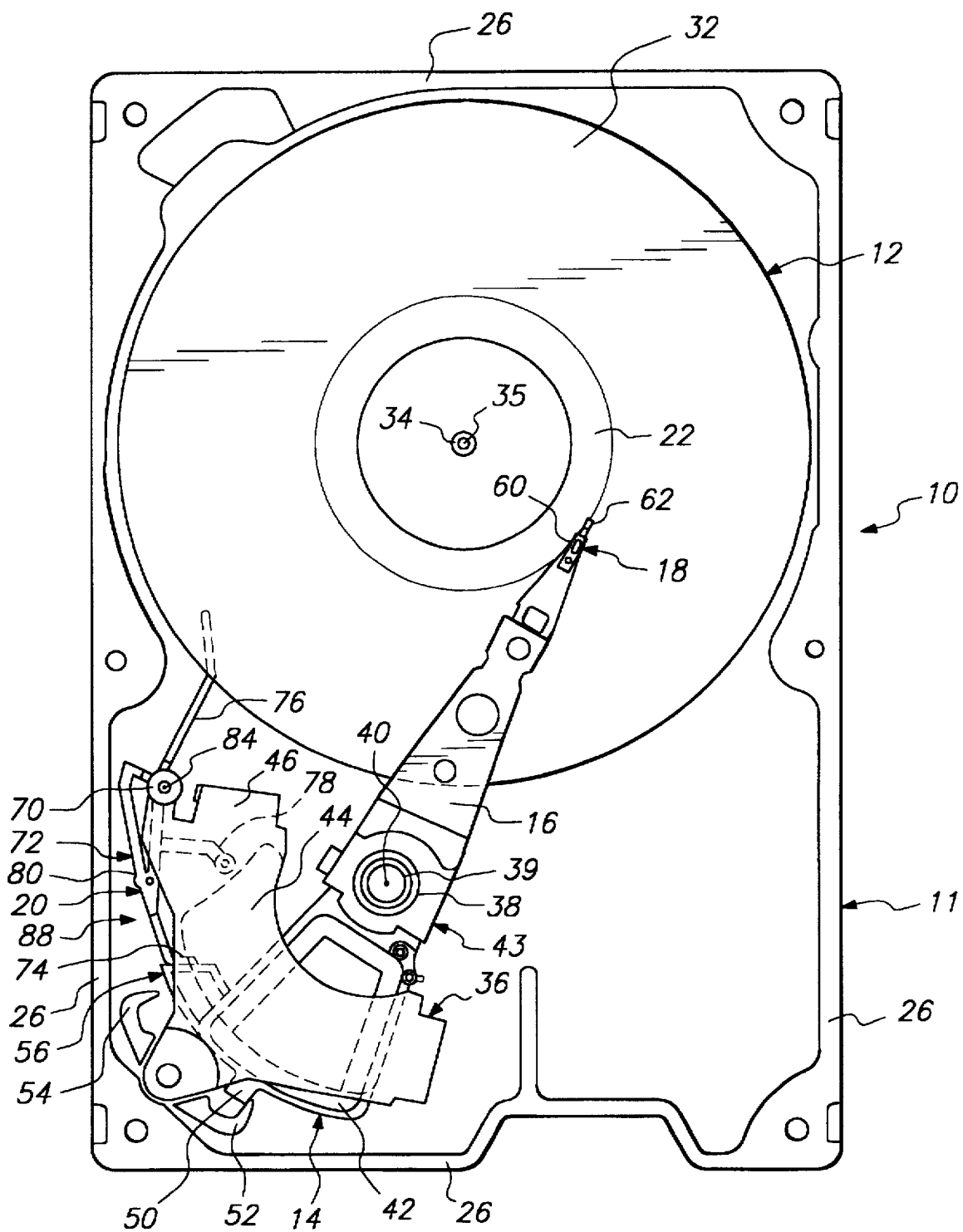
FIG. 1 is a simplified, top plan view of a disk drive including a latch having features of the present invention, the latch is in the engaged position.
Figure 2:
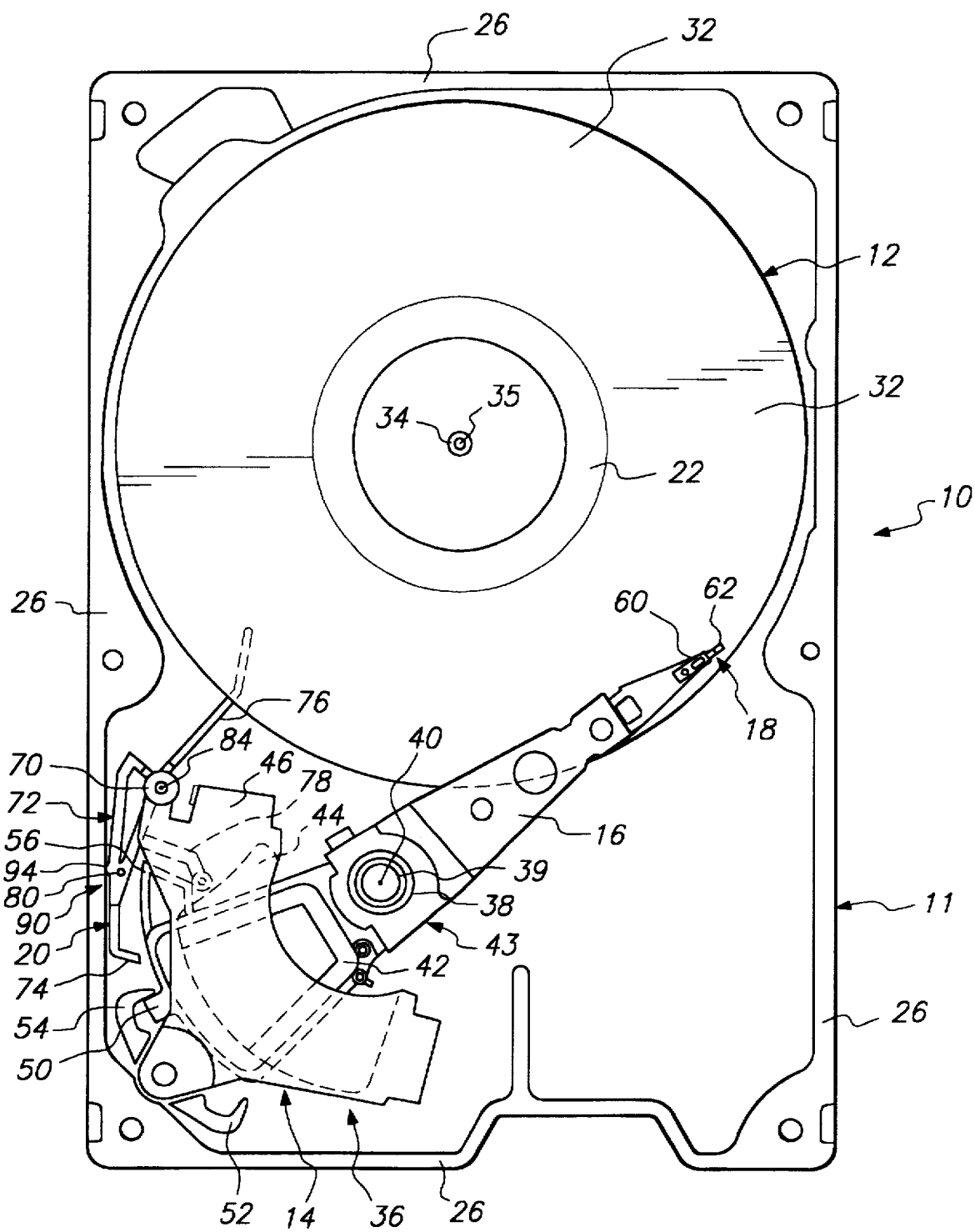
FIG. 2 is a simplified plan view of the disk drive and latch of FIG. 1 with the latch in the disengaged position.

Referring initially to FIGS. 1 and 2, a disk drive 10 according to the present invention includes a drive housing 11, at least one storage disk 12, an actuator assembly 14 having an actuator arm 16 for positioning a transducer assembly 18 proximate the storage disk 12, and a latch 20. As provided herein, the latch 20 securely inhibits the rotation of the actuator assembly 14 when the disk 12 is not rotating. This securely holds the transducer assembly 18 in a landing zone 22 of the storage disk 12 during shock to the disk drive 10, thereby preventing data loss and/or damage to the transducer assembly 18.

A detailed description of the various components of a disk drive 10 is provided in U.S. Pat. No. 5,319,511, issued to Lin, and assigned to Quantum Corporation, the assignee of the present invention. The contents of U.S. Pat. No. 5,319,511 are incorporated herein by reference. Accordingly, only the structural aspects of a disk drive 10 which are particularly significant to the present invention are provided herein.

The drive housing 11 retains the various components of the disk drive 10. The drive housing 11, shown in FIGS. 1 and 2, includes four (4) side walls 26. A typical drive housing 11 also includes a cover and base (not shown for clarity), which are spaced apart by the side walls 26. A printed circuit board which carries the electronic components of the disk drive 10 is also not shown for clarity.

The following discussion describes the operation of a disk drive 10 having a single data storage disk 12. However, those skilled in the art will recognize that the present invention is capable of being used in a disk drive 10 having a plurality of storage disks. 12. For example, the disk drive 10 can include six (6), nine (9), or twelve (12) spaced apart storage disks 12.

The storage disk 12 stores data in a form that can be subsequently retrieved if necessary. A magnetic storage disk 12 is commonly used to store data in digital form. Alternately, for example, the storage disk 12 can be optical or magneto-optical. For conservation of space, each storage disk 12 preferably includes a data storage surface 32 on each side of the storage disk 12. These storage surfaces 32 are typically divided into a plurality of narrow, annular regions (not shown) of different radii, commonly referred to as "tracks."

Each disk 12 can include the landing zone 22 which is typically positioned proximate the inner diameter of the disk 12. The landing zone 22 is textured to facilitate contact with the transducer assembly 18 during starting and stopping of the disk drive 10. When the disks 12 are not rotating, the transducer assembly 18 rests on the surface of the landing zone 22 to prevent data loss caused by contact between the transducer assembly 18 and the storage surface 32.

The storage disk 12 is rotated by a disk spindle 34 that is journalled to the drive housing 11 and rotates about a spindle axis 35 relative to the drive housing 11. The disk spindle 34 is rotated at a predetermined angular velocity by a disk motor (not shown). The required rotation rate of the storage disks 12 varies according to the design of the disk drive 10.

The actuator assembly 14 includes the actuator arm 16 for retaining the transducer assembly 18 proximate the storage surface 32 and a voice coil motor 36 for moving the actuator arm 16. In the embodiment shown in the Figures, the actuator arm 16 is attached to and cantilevers from an actuator hub 38. In this embodiment, the actuator hub 38 is mounted to an actuator shaft 39 which rotates relative to the drive housing 11 on an actuator bearing assembly (not shown). This allows the actuator hub 38 to rotate about an actuator axis 40 which is substantially parallel with the spindle axis 35.

The voice coil motor 36 precisely moves the actuator hub 38, the actuator arms 16 and the transducer assembly 18 relative to the storage disks 12. Basically, the voice coil motor 36 moves the data transducers 18 between the radially innermost landing zone 22 and the plurality of annular tracks defined in the storage surface 32 of the disks 12.

The voice coil motor 36 can be implemented in a number of alternate ways known by those skilled in the art. For example, the voice coil motor 36 can be a rotary voice coil motor or a linear voice coil motor. In the embodiment shown in the Figures, the voice coil motor 36 is a rotary voice coil motor. In this embodiment, activation of the voice coil motor 36 rotates the actuator hub 38 and moves the actuator arms 16 over the concentric data tracks on the disk 12. Typically, the voice coil motor 36 includes a flat, trapezoidal coil 42 that is attached to the actuator hub 38. The combination of the actuator arm 16, the actuator hub 38, and the coil 42 is referred to herein as an actuator body 43.

The coil 42 is disposed between a pair of spaced apart permanent magnets 44 (only one (1) magnet is shown in the Figures in phantom) and a pair of spaced apart flux return plates 46 (only one (1) flux return plate is shown in the Figures) which are secured to the drive housing 11. The magnets 44 have pole faces of opposite polarity directly facing opposite legs of the coil 42. The resultant magnetic fields are such that current passing through the coil 42 in one direction causes rotation of the actuator body 43 in one radial direction relative to the disks 12 (such as the radially outward direction) while reverse current causes reverse direction movement (such as the radially inward direction). Thus, the voice coil motor 36 is able to bi-directionally rotate the actuator body 43 relative to the drive housing 11 around the actuator axis 40.

Typically, the actuator body 43 is movable by the voice coil motor 36 through a range of limited angular displacement after the latch 20 provided herein is released. This limited movement allows the actuator assembly 14 to position the transducer assembly 18 over the desired data tracks. When the coil 42 is deactivated, the voice coil motor 36 positions the transducer assembly 18 at the landing zone 22.

Preferably, the disk drive 10 includes an actuator limiter 50 that is integrally formed with the voice coil motor 36 to limit the rotary travel of the actuator body 43. Referring to FIGS. 1 and 2, the actuator limiter 50 contacts an actuator inner crash stop 52 and an actuator outer crash 54 which are secured to the drive housing 11. The actuator limiter 50 prevents the actuator body 43 from positioning the transducer assembly 18 beyond the outer periphery of the disk 12 or crashing the transducer assembly 18 into the disk spindle 34.

Figure 3:
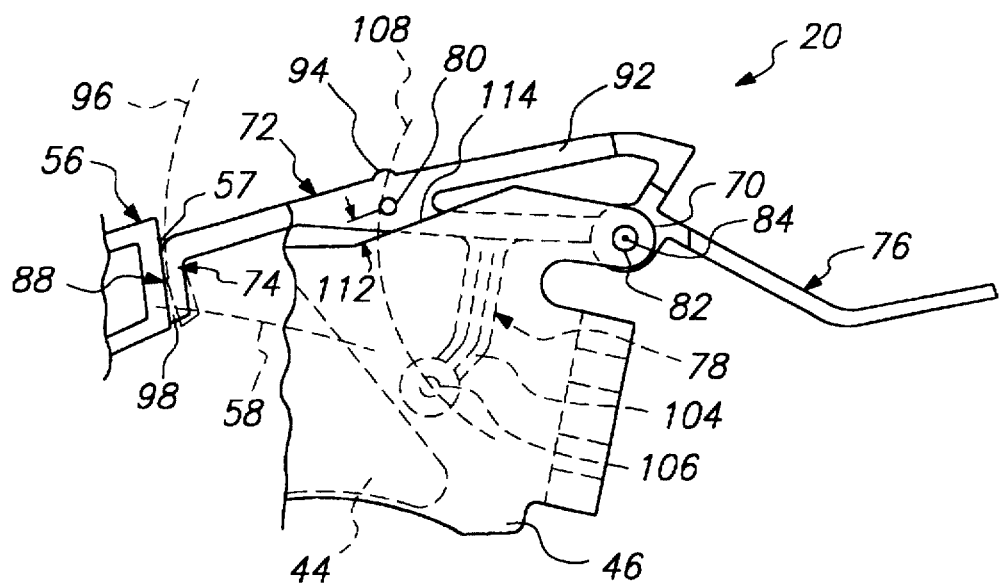
FIG. 3 is an enlarged view of a portion of the disk drive and the latch of FIG. 1.

Referring to FIGS. 1-3, the actuator body 43 also includes an actuator contact area 56 for contacting the latch 20. As can best be seen in FIG. 3, the actuator contact area 56 moves with the actuator body 43 on an actuator path 58 relative to the drive housing 11. In this embodiment, the actuator contact area 56 is attached to the coil 42 and includes a concave area 57 that is directed towards the latch 20. The concave area 57 facilitates engagement with the latch 20 and allows the latch 20 to move in close proximity to the actuator contact area 56.

The transducer assembly 18 includes a load beam 60 and a data transducer 62. The load beam 60 attaches the data transducer 62 to the actuator arm 16. Typically, each load beam 60 is flexible in a direction perpendicular to the storage disk 12 and acts as a spring for supporting the data transducer 62. As the disk 12 rotates, air flow between the data transducer 62 and storage disk 12 causes the data transducer 62 to ride at an aerodynamically stabilized distance from the storage surface 32 of the storage disk 12. Each load beam 60 is resilient and biased to urge each data transducer 62 towards the storage surface 32.

The data transducer 62 interacts with the storage surface 32 to access or transfer information to the storage disk 12. For a magnetic storage disk 12, the data transducer 62 is commonly referred to as a read/write head. To read or access data from a magnetic storage disk 12, the data transducer 62 produces electronic read signals in response to the passage of the tracks on the storage surface 32 of the disk 12. To write or transfer data to the disk 12, the data transducer 62 generates a magnetic field which is capable of polarizing the desired region of the storage surface 32.

It is anticipated that the present device can be utilized for data transducers 62 other than read/write heads for a magnetic storage disk 12. For example, the present invention may be used with an electrooptical transducer for accessing data stored on optical disks.

The latch 20 inhibits the rotation of the actuator body 43 and retains the transducer assembly 18 in the landing zone 22 when the disk 12 is not spinning at a nominal speed, such as 5,400 RPM. This prevents damage to the storage surface 32 when the transducer assembly 18 is not flying on an air bearing generated by the rotation of the disk 12.

As can best be seen with reference to FIGS. 3-6, the latch 20 includes a latch hub 70, a latch arm 72, a latch contact area 74, an air vane 76, a return device 78 and a secondary stop 80. The latch hub 70 is tubular and is journalled to the drive housing 11 with a latch pin 82. The latch hub 70 rotates on a latch axis 84 relative to the drive housing 11 around the latch pin 82. Preferably, the latch hub 70 includes an annular chamfer 86 proximate each opposed end to minimize surface contact and friction between the moving latch hub 70 and the drive housing 11.

The latch arm 72 is secured to the latch hub 70 and rotates with the latch hub 70 relative to the drive housing 11. In the embodiment shown in the Figures, the latch arm 72 moves between an engaged position 88 (shown in FIGS. 1 and 3) and a disengaged position 90 (shown in FIG. 2). In the engaged position 88 the latch 20 restrains movement of the actuator body 43, while in the disengaged position 90, the actuator body 43 is not restrained by the latch 20.

Figure 4:
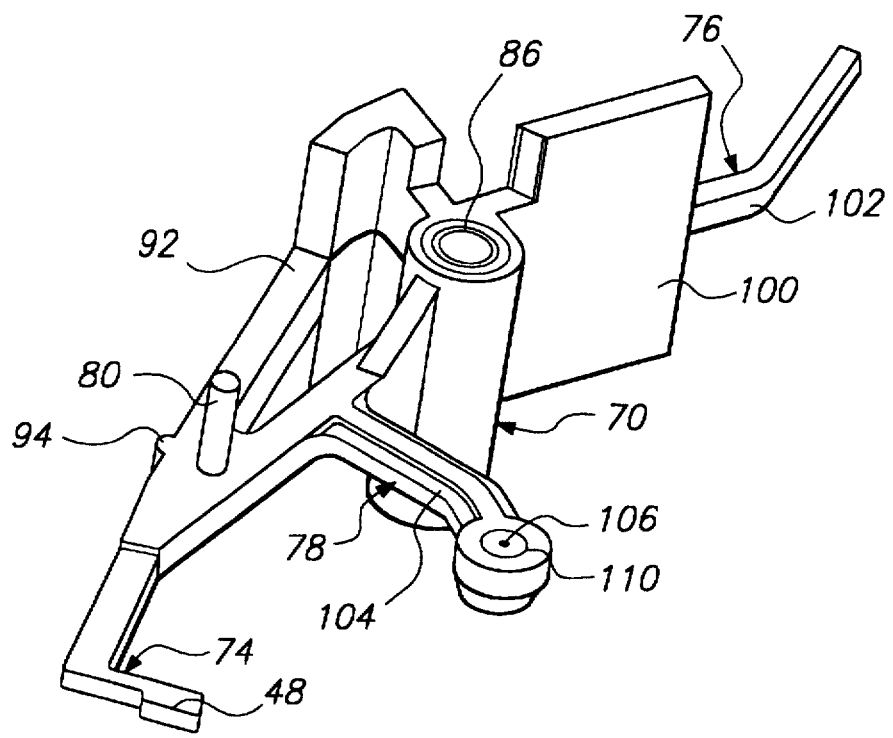
FIG. 4 is a perspective view of a latch having features of the present invention.

As can best be seen in FIG. 4, the latch arm 72 supports the latch contact area 74, the return device 78, and the secondary stop 80. Preferably, the latch arm 72 includes a triangular shaped section 92, which extends between the latch hub 70 and proximate the latch contact area 74, to inhibit deflection of the latch arm 72.

Additionally, the latch arm 72 can include a latch limiter 94 to limit the rotation of the latch arm 72 in the disengaged position 90 in response to airflow displacement forces. Referring to FIG. 2, the latch limiter 94 is a protruding area which extends from the latch arm 72. In this embodiment, the latch limiter 94 contacts one of the side walls 26 of the drive housing 11 and limits the travel of the latch arm 72 in the clockwise direction.

The latch contact area 74 is secured to the latch arm 72 and moves with the latch arm 72 on a latch path 96 as the latch arm 72 moves between the engaged position 88 and the disengaged position 90. Referring again to FIG. 3, in the engaged position 88, the latch contact area 74 is positioned within the actuator path 58 and engages the actuator contact area 56 to inhibit rotation of the actuator body 43. In the disengaged position 90, the latch contact area 74 is positioned outside the actuator path 58 and the actuator body 43 is free to rotate.

In the embodiment shown in the Figures, the latch contact area 74 is positioned proximate a distal end of the latch arm 72. Preferably, as shown in phantom in FIG. 3, the latch contact area 74 flexes to absorb shock without creating a rotational moment on the latch 20. This can be accomplished by having the latch contact area 74 extend laterally and cantilever from the latch arm 72. In this configuration, the latch contact area 74 deflects towards the latch hub 70 to absorb shock to the disk drive 10. Since the latch contact area 74 deflects towards the point of rotation of the latch 20, i.e., the latch axis 84, the deflection results in minimal rotational movement of latch arm 72. Moreover, the latch contact area 74 can include a protruding contact area 98 to facilitate bending of the latch contact area 74 towards the latch hub 70.

The air vane 76 moves the latch 20 from the engaged position 88 to the disengaged position 90 upon sufficient rotation of the disk 12. The design of the air vane 76 varies according to the design of disk drive 10. In the embodiment shown in the Figures, the air vane 76 is secured to the latch hub 70 and includes a rectangular sail area 100 and a distal strip 102. The sail 100 is attached to the latch hub 70 and is positioned proximate the disks 12, while the distal strip 102 is attached to the sail 100 and is positioned over or between the disk(s) 12. When the disk 12 is rotated at a sufficient speed, the air flow generated by the spinning disk 12 impinges against the air vane 76 and overcomes the biasing of the return device 78. This moves the latch 20 from the engaged position 88 to the disengaged position 90. The sail 100 and distal strip 102 are sized to ensure that the air vane 76 catches as much air as possible to increase the reliability of the latch 20.

The return device 78 moves the latch arm 72 from the disengaged position 90 towards the engaged position 88 during non-rotation or nominal rotation of the disk 12. Stated another way, the return device 78 biases the latch arm 72 to return toward the engaged position 88 when the disk 12 is not spinning. Because of the unique design of the return device 78 provided herein, the return device 78 retains the latch arm 72 in the engaged position 88 without the need of a stopping pin (not shown).

Figure 5:
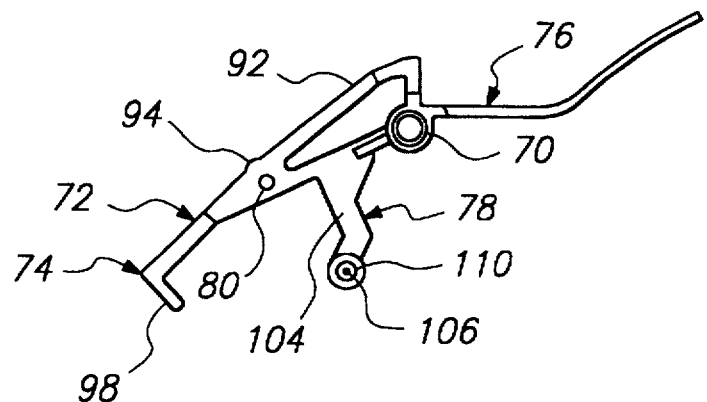
FIG. 5 is a top plan view of the latch of FIG. 4.
Figure 6:
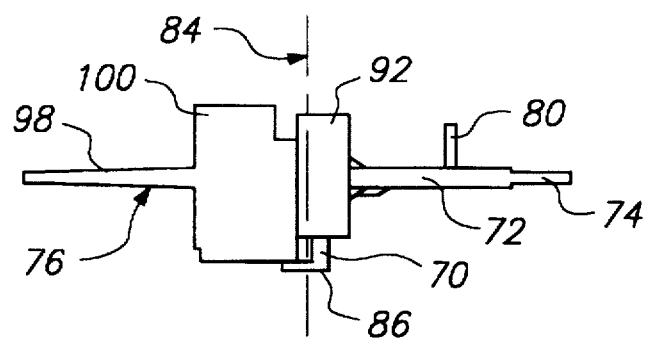
FIG. 6 is a rear view of the latch of FIG. 4.

Referring to FIGS. 3-5, the return device 78 includes a return arm 104 which extends laterally from the latch arm 72 and a ferromagnetic body 106 which is secured to the return arm 104. The ferromagnetic body 106 is attracted to a fringe magnetic field provided by the magnets 44 and moves the latch arm 72 to the engaged position 88. Further, the attraction between the ferromagnetic body 106 to the magnets 44 retains the latch arm 72 in the engaged position 88 when the disks 12 are not rotating.

The return arm 104 is shaped so that the ferromagnetic body 106 moves on a body path 108 which is closest to the magnets 44 when the latch arm 72 is in the engaged position 88. Because the body path 108 is closest to the magnets 44 when the latch arm 72 is in the engaged position 88, a stopping pin is not necessary. Therefore, travel of the latch arm 72 in the counterclockwise direction is limited by the return device 78.

In the embodiment shown in the Figures, the ferromagnetic body 106 is a spherical ball that is press fitted in a body aperture 110 in the return arm 104. Alternately, the ferromagnetic body 106 can be some other shape and can be attached to the return arm 104 by some other fashion. The ferromagnetic body 106 can be composed of a low carbon steel or another material which is attracted to the magnets 44.

The secondary stop 80 is secured to the latch arm 72 and dampens the movement of the latch arm 72 after a rotary shock has been applied to the disk drive 10. As can best be seen from FIG. 3, the secondary stop 80 is positioned proximate a latch crash stop 114 of the disk drive 10. As discussed above, the return device 78 retains the latch arm 72 in the engaged position 88. Therefore, it is important to recognize that the secondary stop 80 is not pulled tightly against the latch crash stop 114 when the latch body 72 is in the engaged position. Instead, the secondary stop 80 is positioned to tightly contact the latch crash stop 114, upon sufficient movement of the latch arm 72, to dampen the movement of the latch arm 72.

Preferably, the secondary stop 80 flexes upon tight contact with the latch crash stop 114 to absorb energy. In the embodiment shown in FIGS. 4-6, the secondary stop 80 is a pin which extends vertically from the latch arm 72. The pin has a cross-sectional diameter of between about 0.5 mm to 2.0 mm.

Preferably, the secondary stop 80 is positioned a travel distance 112 away from the latch crash stop 114 when the latch arm 72 is in the engaged position 88. This configuration allows the latch arm 72 to deflect the travel distance 112 to dissipate energy, before the secondary stop 80 contacts the latch crash stop 114. Therefore, the secondary stop 80 impacts the latch crash stop 114 with less force and the latch arm 72 is more stable. The travel distance 112 should be as large as possible, given the size limitations for the disk drive 10. It is anticipated that a travel distance 112 of between about 0.5 mm and 10.0 mm can be incorporated into present disk drives 10.

In the embodiment shown in the Figures, the latch crash stop 114 is a portion of the flux return plate 46 which extends past the magnets 44. However, those skilled in the art will recognize that another part of the drive housing 11, such as a portion of the cover, can be used as the latch crash stop 114.

Optimumly, the latch 20 is mass-balanced about the latch axis 84 to facilitate easy movement of the latch 20 and to minimize the effects of linear shock on the latch 20. Further, for ease of manufacturing, the latch 20 is preferably injected and made of a suitable molded plastic.

Importantly, the latch 20 disclosed herein includes a secondary stop 80, a deflecting latch contact area 74, and a relatively rigid latch arm 72 to inhibit release of the latch 70 in the event of a relatively large rotary shock.

OPERATION

Referring initially to FIG. 1, during non-rotation of the disk 12, the actuator assembly 14 positions the transducer assembly 18 at the landing zone 22. At this time, the ferromagnetic body 106 is drawn by the fringe field of the magnets 44 along the body path 108 until the latch arm 72 is in the engaged position 88. In this position, the latch contact area 74 is adjacent the actuator contact area 56 and prevents the actuator body 43 from rotating in a radially outward direction relative to the disk 12.

Subsequently, referring to FIG. 2, when the disk 12 is rotated, air flow generated by the disk 12 impinges upon the air vane 76. When the disk 12 is rotated proximate the operational speed of the disk 12, sufficient force is generated to overcome the attraction force between the ferromagnetic body 106 and the stray magnetic field. This causes the latch arm 72 to rotate to the disengaged position 90. The radial displacement of the latch arm 72 to the disengaged position 90 has the effect of moving the latch contact area 74 out of the way of the actuator contact area 56 and the actuator path 58, thereby releasing the actuator body 43 for movement. At the same time, the rotational movement of the latch arm 72 causes the ferromagnetic body 106 to be displaced further away from the magnets 44. This results in reduced magnetically induced biased force.

When the disk 12 is spinning down, the energy stored in the rotating disk 12 is automatically supplied to the voice coil motor 36 in a flow direction appropriate to cause the voice coil motor 36 to move the actuator body 43 towards the landing zone 22. During this time, air flow bias force drops as the disk 12 spins down. When the magnetic bias force equals and exceeds air flow force, the ferromagnetic body 106 causes the latch arm 72 to move to the engaged position 88. During pivoting of the latch arm 72 to the engaged position 88, the latch contact area 74 passes by and clears the actuator contact area 56 of the latch arm 72. In the engaged position 88, the latch contact area 74 is adjacent the actuator contact area 56.

Accordingly, the present invention causes the actuator body 43 to be positively latched with the transducer assembly 18 in the landing zone 22, during take off, landing, and non-operation of the disk drive 10. In addition, the present invention overcomes the problems associated with prior latches, since the secondary stop 80 and the latch contact area 74 are able to dampen the vibration and movement of the latch 20. Thus, the latch 20 remains in the engaged position 88 even after the disk drive 10 is subjected to relatively large rotational shock forces, i.e., in excess of 40,000 rad/s**2.

While the particular disk drive 10, as herein shown and disclosed in detail, is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A latch for selectively restraining a transducer substantially in a landing zone of a storage disk for a disk drive, the disk drive including an actuator assembly for positioning the transducer and a latch crash stop, the latch comprising:

a latch arm movable between an engaged position and a disengaged position;

a latch contact area for engaging the actuator assembly when the latch arm is in the engaged position;

a return device which retains the latch arm in the engaged position;

a secondary stop which is positioned proximate the latch crash stop of the disk drive, when the latch arm is in the engaged position, the secondary stop engaging the latch crash stop upon sufficient movement of the latch arm caused by a shock to the disk drive and partly dampening the movement of the latch arm; and an air vane adapted for moving the latch arm from the engaged position to the disengaged position upon rotation of the storage disks.

2. The latch of claim 1 wherein the secondary stop is a pin which extends away from the latch arm.

3. The latch of claim 1 wherein the secondary stop is positioned a travel distance away from the latch crash stop of the disk drive, when the latch arm is in the engaged position.

4. The latch of claim 1 wherein the return device includes a ferromagnetic body which is attracted to a magnet of the actuator assembly.

5. The latch of claim 4 wherein the ferromagnetic body moves on a body path which is closest to the magnet when the latch arm is in the engaged position.

6. The latch of claim 1 wherein the latch arm includes a triangular shaped support section which inhibits bending.

7. The latch of claim 1 wherein the latch includes a latch hub and the latch contact area extends laterally from the latch arm and deflects towards the latch hub to absorb shock to the disk drive.

8. A disk drive including the latch of claim 1, a drive housing, a storage disk having a landing zone, and an actuator assembly for positioning a transducer in the landing zone.

9. The disk drive of claim 8 wherein the actuator assembly includes a flux return plate secured to the drive housing and the latch crash stop is the flux return plate.

10. The disk drive of claim 9 wherein the actuator assembly includes an actuator body having an actuator contact area which moves on an actuator path relative to the drive housing and the latch contact area moves on a latch path relative to the drive housing when the latch arm is moved between the engaged position and the disengaged position, the latch path intersecting the actuator path when the latch arm is in the engaged position.

11. A latch for selectively restraining a transducer substantially in a landing zone of a storage disk for a disk drive, the disk drive including a drive housing and an actuator assembly for positioning the transducer, the latch comprising:

a latch hub which rotates relative to the drive housing;

a latch arm which rotates with the latch hub between an engaged position and a disengaged position; and a latch contact area for engaging the actuator assembly when the latch arm is in the engaged position to hold the transducer substantially in the landing zone, the latch contact area cantilevering substantially laterally from the latch arm and deflecting towards the latch hub when a sufficient shock is applied to the disk drive the latch contact area including a protruding contact area extending away from proximate a distal portion of the latch contact area, the protruding contact area contacting the actuator assembly and facilitating bending of the latch contact area to absorb a shock load.

12. The latch of claim 11 wherein the latch arm includes a triangular shaped support section which inhibits bending of the latch arm.

13. A disk drive including the latch of claim 11, a drive housing, a storage disk having a landing zone, and an actuator assembly for positioning a transducer in the landing zone.

14. The disk drive of claim 13 wherein the actuator assembly includes a flux return plate secured to the drive housing and the latch includes a secondary stop which is positioned a travel distance away from the flux return plate, when the latch arm is in the engaged position, the secondary stop engaging the flux return plate of the disk drive upon sufficient movement of the latch arm, caused by a shock to the disk drive, and partly dampening the movement of the latch arm.

15. A latch for selectively restraining a transducer substantially in a landing zone of a storage disk for a disk drive, the disk drive including an actuator assembly for positioning the transducer and a drive housing, the actuator assembly including an actuator contact area which moves on an actuator path relative to the drive housing, a flux return plate which is secured to the drive housing, and a magnet which is secured to the drive housing, the latch comprising:

a latch hub which is pivotally attached to the disk housing;

a latch arm which pivots with the latch hub between an engaged position and disengaged position;

a latch contact area which pivots with the latch arm, the latch contact area being positioned in the actuator path when the latch arm is substantially in the engaged position to engage the actuator contact area and inhibit movement of the actuator contact area, the latch contact area being positioned outside the actuator path when the latch arm is in the disengaged position;

an air vane which moves the latch arm towards the disengaged position upon sufficient rotation of the storage disk;

a return device which retains the latch arm in the engaged position upon non-rotation of the storage disk, the return device including a ferromagnetic body which moves on a body path which is closest to the magnet when the latch arm is in the engaged position; and a secondary stop which moves with the latch arm, the secondary stop being positioned a travel distance away from the flux return plate when the latch arm is in the engaged position, the secondary stop engaging the flux return plate upon sufficient movement of the latch body caused by a shock to the disk drive and partly dampening the movement of the latch arm.

16. The latch of claim 15 wherein, the travel distance is at least about 0.5 mm.

17. The latch of claim 15 wherein, the latch contact area extends substantially laterally from the latch arm and deflecting towards the latch hub when a sufficient shock is applied to the disk drive.

18. The latch of claim 17 wherein the latch arm includes a triangular shaped support section which inhibits bending of the latch arm.

19. A disk drive including the latch of claim 15.

20. A method for selectively restraining a transducer substantially in a landing zone of a storage disk for a disk drive, the disk drive including an actuator assembly having a magnet for positioning the transducer and a latch crash stop, the method comprising the steps of:

retaining a latch arm in an engaged position during non-rotation of the storage disk with a return device, the return device including a ferromagnetic body which travels on a body path which is closest to the magnet when the latch arm is in the engaged position the latch arm including a latch contact area adapted to engage the actuator assembly to inhibit movement of the transducer when the latch arm is in the engaged position; and inhibiting movement of the latch arm from the engaged position during shock to the disk drive with a secondary stop that is positioned a travel distance away from the latch crash stop of the disk drive, when the latch arm is in the engaged position, the secondary stop engaging the latch crash stop of the disk drive upon sufficient movement of the latch arm and partly dampening the movement of the latch arm.

21. The method of claim 20 comprising the step of moving the latch arm to a disengaged position with an air vane during sufficient rotation of the storage disk.

22. A latch for selectively restraining a transducer substantially in a landing zone of a storage disk for a disk drive, the disk drive including an actuator assembly for positioning the transducer, a magnet, a latch pin, and a latch crash stop, the latch comprising:

a latch arm movable between an engaged position and a disengaged position relative to the latch pin;

a latch contact area for engaging the actuator assembly when the latch arm is in the engaged position;

a return device which retains the latch arm in the engaged position, the return device including a ferromagnetic body which is attracted to the magnet, the ferromagnetic body moving on a body path relative to the latch pin, the ferromagnetic body being positioned away from the latch arm so that the body path is closest to the magnet when the latch arm is in the engaged position to hold the transducer substantially in the landing zone; and a secondary stop which is positioned at least about 0.5 mm away from the latch crash stop of the disk drive when the latch arm is in the engaged position, the secondary stop engaging the latch crash stop upon sufficient movement of the latch arm caused by a shock to the disk drive and partly dampening the movement of the latch arm.

23. The latch of claim 22 wherein the secondary stop is positioned proximate to the latch crash stop when the latch arm is in the engaged position, the secondary stop including a pin which extends away from the latch arm and engages the latch crash stop upon sufficient movement of the latch arm caused by a shock to the disk drive and partly dampens the movement of the latch arm.

24. A disk drive including the latch of claim 22.

25. A latch for selectively restraining a transducer substantially in a landing zone of a storage disk for a disk drive, the disk drive including an actuator assembly for positioning the transducer and a latch crash stop, the latch comprising:

a latch arm movable between an engaged position and a disengaged position;

a latch contact area for engaging the actuator assembly when the latch arm is in the engaged position;

a return device which retains the latch arm in the engaged position; and a secondary stop which is positioned proximate the latch crash stop of the disk drive, when the latch arm is in the engaged position, the secondary stop including a pin which extends away from the latch arm, the secondary stop engaging the latch crash stop upon sufficient movement of the latch arm caused by a shock to the disk drive and partly dampening the movement of the latch arm.

26. The latch of claim 25 wherein the secondary stop is positioned a travel distance which is at least approximately 0.5 mm.

27. A disk drive including the latch of claim 25.

28. A latch for selectively restraining a transducer substantially in a landing zone of a storage disk for a disk drive, the disk drive including an actuator assembly for positioning the transducer and a latch crash stop, the latch comprising:

a latch arm movable between an engaged position and a disengaged position;

a latch contact area for engaging the actuator assembly when the latch arm is in the engaged position;

a return device which retains the latch arm in the engaged position to hold the transducer substantially in the landing zone; and a secondary stop which is positioned a travel distance away from the latch crash stop of the disk drive, when the latch arm is in the engaged position, the secondary stop contacting the latch crash stop upon sufficient movement of the latch arm caused by a shock to the disk drive and partly dampening the movement of the latch arm.

29. The latch of claim 28 wherein the secondary stop is a pin which extends away from the latch arm.

30. The latch of claim 28 wherein the travel distance is at least about 0.5 mm.

31. A disk drive including the latch of claim 28.

* * * * *